United States Patent
Aliesch

(10) Patent No.: US 9,617,079 B2
(45) Date of Patent: Apr. 11, 2017

(54) CONVEYING DEVICE WITH A BRAKING DEVICE

(71) Applicant: WRH Walter Reist Holding AG, Ermatingen (CH)

(72) Inventor: Robert Aliesch, Gross (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 14/865,688

(22) Filed: Sep. 25, 2015

(65) Prior Publication Data
US 2016/0090243 A1    Mar. 31, 2016

(30) Foreign Application Priority Data

Sep. 30, 2014   (CH) ...................... 1485/14

(51) Int. Cl.
  *B65G 23/26*  (2006.01)
  *B65G 23/44*  (2006.01)
  *B65G 15/62*  (2006.01)

(52) U.S. Cl.
  CPC ............. *B65G 23/26* (2013.01); *B65G 15/62* (2013.01); *B65G 23/44* (2013.01)

(58) Field of Classification Search
  CPC ......... B65G 23/44; B65G 15/62; B65G 23/26
  See application file for complete search history.

(56) References Cited

U.S. PATENT DOCUMENTS

| | | | |
|---|---|---|---|
| 4,436,200 A | 3/1984 | Hodlewsky et al. | |
| 4,505,692 A | 3/1985 | Boos et al. | |
| 5,361,893 A * | 11/1994 | Lapeyre | B65G 17/08 198/690.2 |
| 6,367,619 B1 | 4/2002 | Cemke, Jr. et al. | |
| 7,594,573 B2 * | 9/2009 | Grabau | B65G 15/64 198/837 |

(Continued)

FOREIGN PATENT DOCUMENTS

| | | |
|---|---|---|
| CH | 706033 | 7/2013 |
| DE | 10 2006 010 974 | 9/2007 |

(Continued)

OTHER PUBLICATIONS

Switzerland Search Report dated Dec. 29, 2014, Application No. CH01485/14.

*Primary Examiner* — Thomas Randazzo
(74) *Attorney, Agent, or Firm* — Rankin, Hill & Clark LLP

(57) ABSTRACT

A conveying device including a circulatorily led, extensively extended conveying element that forms a conveying section with a conveying surface and a return section, a front head-end region, in which the conveying element is deflected from the conveying section into the return section in the movement direction of the conveying element, and a braking device that exerts a braking effect upon the driven conveying element. The braking device includes a braking surface that, by way of the sliding friction with the conveying element, at least partly exerts the braking effect upon the driven conveying element. The braking device is designed and arranged such that it exerts the braking effect upon the conveying element outside the front head-end region as well as outside the conveying section. The braking surface is designed in an essentially bent manner and is wrapped by a part of the conveying element.

15 Claims, 10 Drawing Sheets

(56) References Cited

U.S. PATENT DOCUMENTS

| | | | |
|---|---|---|---|
| 7,681,719 B2* | 3/2010 | Hosch | B65G 15/62 198/841 |
| 9,108,802 B2* | 8/2015 | Wehner | B60P 1/38 |
| 9,242,801 B2* | 1/2016 | Degroot | B65G 23/26 |
| 9,266,679 B2* | 2/2016 | Reist | B65G 15/02 |
| 9,359,141 B2* | 6/2016 | Degroot | B65G 23/44 |
| 2004/0211652 A1* | 10/2004 | Abbestam | B65G 15/62 198/860.1 |
| 2007/0295582 A1 | 12/2007 | DePaso | |
| 2008/0146391 A1* | 6/2008 | DeGroot | B65G 15/26 474/153 |
| 2014/0116856 A1 | 5/2014 | Degroot et al. | |

FOREIGN PATENT DOCUMENTS

| | | |
|---|---|---|
| EP | 0 088 042 | 9/1983 |
| EP | 0 583 849 | 2/1994 |
| JP | 61-117035 | 10/1976 |
| JP | 3-125722 | 5/1991 |
| JP | 10-167441 | 6/1998 |
| WO | 2007/124749 | 11/2007 |
| WO | 2013/016833 | 2/2013 |
| WO | 2014/066578 | 5/2014 |

* cited by examiner

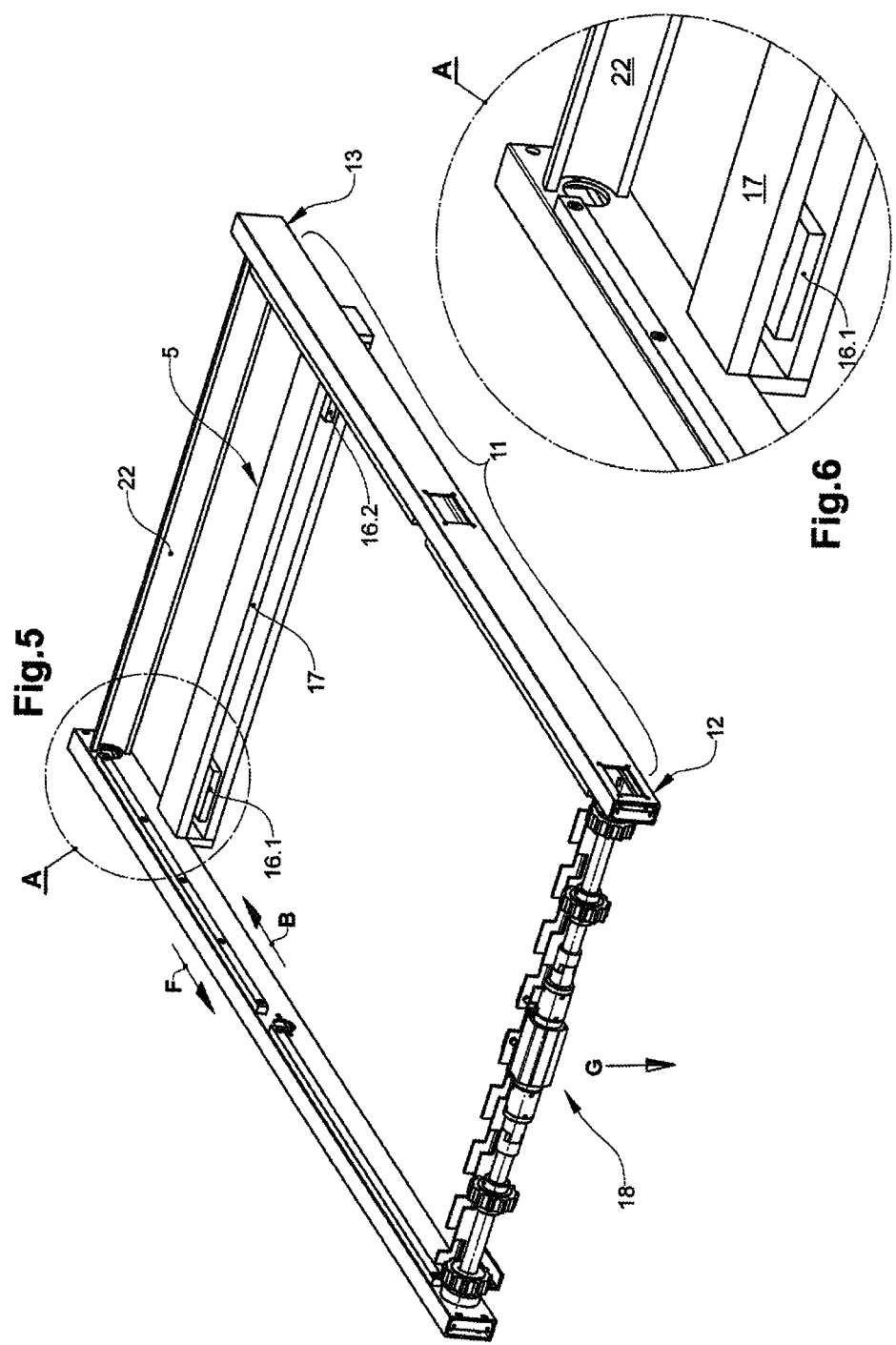

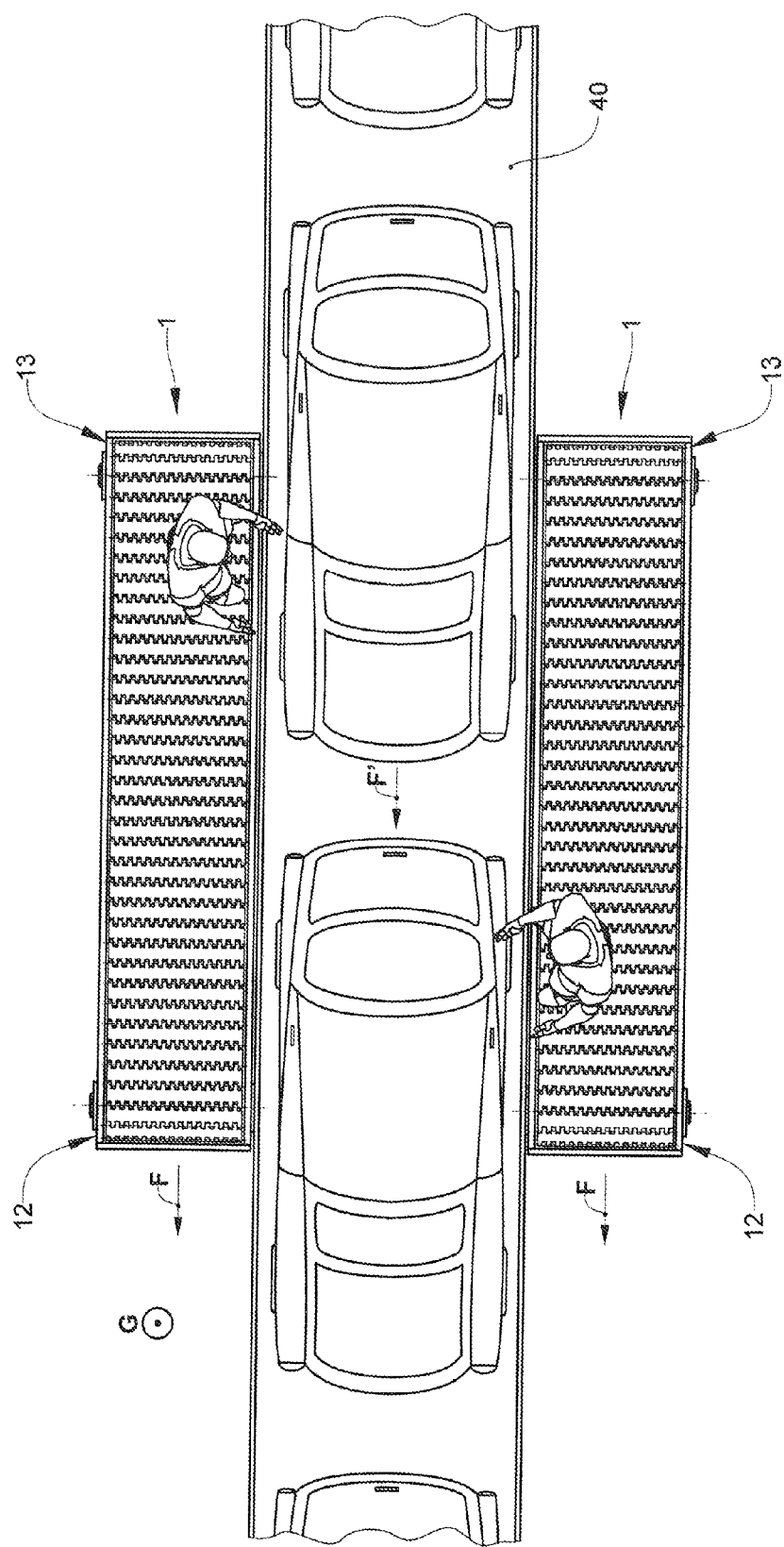

CONVEYING DEVICE WITH A BRAKING DEVICE

BACKGROUND OF THE INVENTION

Field of the Invention

The invention relates to the field of conveying devices with a braking device. Such a conveying device includes a circulatorily led, extensively extended conveying element which forms a conveying section with a conveying surface and a return section. It also includes a front head-end region, in which the conveying element is deflected from the conveying section into the return section in the movement direction of the conveying element, as well as a braking device which is designed for exerting a braking effect upon the driven conveying element.

Description of Related Art

The braking devices in the conveying devices are used in order to brake the conveying element and in particular to move it in a controlled manner by way of the braking. Braking devices which interact with a drive are often used, and this permits a high degree of control of the movements of the conveying element. Braking devices amongst other things can be used in order to subject the conveying element or at least a section of the conveying element which is located downstream of the brake in the movement direction of the conveying element, to tension in a targeted manner. The conveying element and, in particular the conveying surface, can be kept taught and/or in the desired shape (e.g., plane) at the corresponding locations by way of tension, at least on the section of the conveying element.

Conveying devices with a circulating, extensively extended conveying element such as a conveying belt or mat chain are known from the state of the art. The conveying elements as a rule are driven via a deflection shaft at one or two deflection locations. Known conveying devices have stationary braking devices with a braking element, which is co-moved with the conveying element. The movement of the conveying element is thereby transmitted onto the braking element and is weakened, thus braked, in the braking device. Thereby, the braking element can be designed as an element engaging into the conveying element, such as a cog, or as a non-engaging element such as a roller.

In a known embodiment, the conveying element is tensioned and deflected between a first braked deflection shaft (thus a co-moved braking element rotating about a stationary axis) and a second non-braked deflection shaft. Thereby, the first braked deflection shaft in a simple embodiment manner can merely be braked by a resistance from its rotary mounting. The braking effect of the first braked deflection roller can increase due to the tensioning between the first and the second deflection shaft.

The mentioned conveying devices are particularly applied as worker-rider belts. Worker-rider belts are designed in order to carry persons working along a production line or on a conveyor belt, and to convey them at least temporarily or continuously in the production direction, so that the persons working in the production line or on the conveyor belt are moved along with the manufactured goods conveyed through the production line or on the conveyor belt. Worker-rider belts are particularly characterised by a low construction height.

Thus, DE 10 2006 010 974 describes a worker-rider belt with a conveying belt as well as an essentially horizontal guide frame with two lateral sidewalls, which extend horizontally in the longitudinal direction of the conveying belt. A deflection roller, which is driven by a drive, is rotatably mounted at the ends of the worker-rider belt in each case. The drive is arranged between the two sidewalls. The conveying belt is tensioned between the two deflection rollers by way of adjustable tensioning devices.

The known braking devices with co-moved braking elements have the disadvantage that their design is complicated. Thus, these braking devices are expensive and complicated in manufacture. An increased probability of failure is also given due to a high number of individual parts. The maintenance and overhaul of such conveying devices accordingly demand much effort and are time-consuming and costly.

In the variant with the tensioned conveying element, the conveying device has the disadvantage that the conveying element is under constant tension, even if the conveying device does not convey anything and even if it is at standstill. The conveying element can become stretched in the course of time due to a continuous tension. This, in turn, can necessitate a (repeated) post-tensioning of the conveying element. Such a tension can load and wear the conveying element.

SUMMARY OF THE INVENTION

It is therefore the object of the invention, to provide a conveying device of the initially mentioned type, which at least partly overcomes at least a part of the disadvantages mentioned above.

The conveying device according to the invention includes:

a circulatorily led, extensively extended conveying element, which forms a conveying section with a conveying surface, and a return section, a front head-end region, in which the conveying element is deflected from the conveying section into the return section in the movement direction of the conveying element, and a braking device, which is designed for exerting a braking effect upon the driven conveying element.

Thereby, the braking device includes a braking surface, which can have a contact fit with the conveying element. The essentially bent braking surface at least partly exerts the braking effect upon the driven conveying element due to the sliding friction with the conveying element. The braking device is moreover designed and arranged, in a manner such that it exerts the braking effect upon the conveying element at a location outside the front head-end region as well as outside the conveying section. The braking surface is designed in an essentially bent manner as well as wrapped by a part of the conveying element The braking surface, in particular, forms a contact fit with the conveying element.

The conveying element can be designed as a modular belt.

A modular belt is a conveying element that is composed of a plurality of separate module elements. The separate module elements are thereby movably connected amongst one another, in particular by way of rotatable connections, such as hinge-like mechanisms for example. A modular belt, for example, can be designed as a chained belt having module elements connected by pivots. A mat chain is an embodiment of a modular belt.

The conveying section is a section of the conveying element, in which objects/subjects that are conveyed by the conveying device can come into contact with the conveying element on conveying. The objects/subjects are conveyed by the conveying device through the conveying section in the conveying direction.

The conveying element in the movement direction of the conveying element runs through the front head-end region downstream of the conveying section. The conveying element is deflected from the conveying section into the return section, in the front head-end region.

The conveying element in the movement direction of the conveying element runs through the return section and thereafter reaches the conveying section again. Thereby, the return section in particular is arranged below the conveying section. Below or at the bottom is indicated as a spatial position downstream in the direction of gravity. The conveying element downstream of the return section in the movement direction of the conveying element runs through a rear head-end region, in which the conveying element is deflected from the return section into the conveying section.

The head-end regions deflect the conveying element and separate the conveying section from the return section. The conveying element thus has four sections which are different to one another: the conveying section, the return section as well as two head-end regions.

The braking device has an essentially bent braking surface. The essentially bent braking surface at least temporarily has a contact fit with the conveying element. This means that a part of the braking surface can be temporarily free of a contact fit with the conveying element. This, for example, is the case with recesses in the conveying element or at locations that cannot contact at all bending radii for geometric reasons. The conveying element, on conveying, slides over the essentially bent braking surface and is subjected to a sliding resistance due to the sliding friction. This sliding resistance, which is caused by the sliding friction, at least partly creates the braking effect upon the driven conveying element.

The braking effect is exerted by the braking device upon the conveying element, outside the conveying section and outside the front head-end section. The braking effect can be exerted upon the conveying element in the return section and/or in the rear head-end region. In particular, the braking effect is exerted upon the conveying element exclusively in the rear head-end region. The braking effect can also be exerted upon the conveying element exclusively in the return section. The braking effect, however, can also be exerted upon the conveying element in the rear head-end region as well as in the return section.

The braking surface is designed in an extensively-surfaced manner (in the sense of having a large, essentially coherent surface without abrupt prominences or recesses).

The braking surface is designed in an essentially bent manner and the conveying element wraps the braking surface. Essentially bent means that the braking surface considered as a whole is designed in a bent manner. A braking surface designed in an essentially bent manner has at least one bend. The at least one bend can have a small or large bending radius. The at least one bend can therefore be designed as a rounded edge or as a slight arching. A braking surface with a single, sharp-bend-like bend as well as a braking surface with a continuous circular-arc-shaped bend with a large bending radius, are braking surfaces designed in an essentially bent manner.

The essentially bent braking surface is essentially arched outwards or bent outwards in the context of a convex bend, by which means it can be wrapped by the conveying element.

A bend of the braking surface within the framework of this application is to be understood as a bend along the movement direction of the conveying element, inasmuch as another directional detail is not explicitly specified. Thus, the bend of the braking surface, which is described above, is to be understood along the movement direction of the conveying element (and for instance not transversely thereto).

A shaping of the braking surface with a bend transverse to the movement direction of the conveying element is possible. Where it is not specified otherwise, what is meant here are braking surfaces that are designed in a straight manner transversely to the movement direction. This means that the bend of the braking surface, which runs in the movement direction of the conveying element, is designed the same over the whole width of the braking surface (thus transverse to the movement direction of the conveying element), inasmuch as is not specified otherwise.

An essentially bent braking surface can be manufactured in a simple and inexpensive manner. The assembly, maintenance and replacement of such a braking surface can be carried out in a simple, rapid and inexpensive manner.

A good and secure contact between the conveying element and the braking surface is ensured by way of the conveying element wrapping the braking surface. A specified strength of the sliding friction can be achieved in a targeted manner depending on the bend of the braking surface—given conditions otherwise remaining the same. The braking force of the braking surface can be determined by the capstan equation (Euler-Eytelwein formula) in the case of a braking surface bent in a round manner (a cylinder sector for instance). The braking force of the braking surface is thereby dependent on the wrap angle, with which the conveying element wraps the braking surface.

The braking force increases with an increasing wrap angle. With the capstan equation, the wrap angle is a factor of the exponent of a natural exponential function.

The braking force of the braking surface can thus be fixed at a desired magnitude by way of a targeted selection of the bend of the brake surface and/or of the wrap angle.

The braking device has a simple design due to the essentially bent braking surface and thus does not have the disadvantages of a complicated design. The braking device in particular can be manufactured inexpensively on account of this. The assembly, maintenance and replacement of the braking device can be carried out rapidly and inexpensively. The braking device has a low number of individual parts, which results in a reduced probability of failure.

The braking device can be designed in a compact manner due to the simple design.

The bend of the braking surface, for example, permits an arrangement of the braking surface in the rear head-end region, by which means the complete conveying device can be designed in a compact manner.

The braking device can apply its braking effect even if the complete conveying element or however also only parts thereof are not under pretension, thanks to the essentially bent braking surface. The conveying device thus has the advantage that the conveying element at least in a part section can be used without a continuous tension and/or can be installed into the conveying device in such a manner. The disadvantages of the variant with a tensioned conveying element, which is to say with a constant tension, and which have been mentioned above, can therefore be avoided and/or reduced if necessary.

The essentially bent braking surface can be arranged on the conveying element at certain positions in accordance with the demands, which results in specific and predefined tensions in certain sections of the conveying element. The braking device can thus subject different sections of the conveying element to different tensions by way of a suitable design and arrangement in the conveying device. This selection possibility is advantageous and permits specific solutions for a multitude of different demands.

The specific and predefined tensions in the certain sections of the conveying element can thereby be differently high, depending on the operating condition of the conveying device (e.g., conveying or standstill). In an embodiment of the conveying device, the braking device can exert the tension that is exerted by it upon at least one section of the conveying element, exclusively given a movement of the conveying element. In another embodiment of the conveying device, the braking device can exert the tension that is exerted by it upon at least one section of the conveying element, given a movement of the conveying element as well as with a standstill of the conveying element. This selection possibility is also advantageous and in turn permits specific solutions for differing requirements.

As an optional feature, the bent braking surface is bent in a uniform manner. The bent braking surface in particular is designed as a circular arc.

Uniformly bent braking surfaces can be manufactured in a simple and rapid manner. A uniform bend has the effect of low wear and a reduced wearing of the conveying element and/or braking surface.

Uniformly bent means that the braking surface has an arched course along the movement direction of the conveying element, wherein the curvature is free of abrupt changes.

The curvature can thereby be differently large at different locations of the braking surface. Thereby, the braking surface is curved exclusively outwards (thus shaped convexly). This means that the braking surface has no parts that are inwardly curved (thus concavely shaped parts).

The curvature in particular is equally large at all locations of the braking surface, by which means the bent braking surface is designed as a circular arc along the movement direction of the conveying element.

The bent braking surface can also be bent in an irregular manner.

The bent braking surface, for example, can also have a constantly increasing or a constantly reducing curvature.

The bent braking surface can include a bend corresponding to a part of an oval and in particular corresponding to a part of an ellipse.

The bent braking surface in particular can have a curvature corresponding to a part of a conic section, thus for example of a hyperbola or a parabola.

The braking surface can also comprise several bends, so that the braking surface is bent in a polygonal manner. The bend of the braking surface can have the shape of a part of a polygon. Thereby, the corners of the polygon are designed as crease-like bends, thus bends with a small bending radius.

The braking device optionally includes at least one cleaning opening

In particular, the braking surface includes at least one cleaning opening.

This cleaning opening can be designed as a slot. What is meant by a slot is an opening that is designed in an elongate manner. A slot is therefore longer than it is wide.

The cleaning opening alternatively to the slot can also be designed with a round shape or with an irregular shape.

In particular, the cleaning opening is formed in a region of the braking device, in which the braking device is arranged directly below a lower side of the conveying element.

Analogously to this, the cleaning device can be designed in a region of the braking surface, in which the braking surface is arranged directly below a lower side of the conveying element.

In particular, the cleaning device is designed as a cleaning opening that goes through a part of the braking device, wherein the part of the braking device with the passing-through cleaning opening is arranged directly below a lower side of the conveying element.

Analogously to this, the cleaning opening can be designed as a cleaning opening going through a part of the braking surface, wherein the part of the braking surface with the passing-through cleaning opening is arranged directly below a lower side of the conveying element.

The cleaning opening can be arranged in a region of the braking device or of the braking surface, in which the deflection of the conveying element is already completed to at least 50%. In particular, the deflection can be already completed to at least 70%. In particular, the deflection can already be completed to at least 85%.

Dust, wear debris and other material can be moved through the cleaning opening arranged directly below a lower side of the conveying element, away from the conveying element and through the braking device or the braking surface. Dust, for example, can settle on the conveying element before the deflection, and this dust falls through the cleaning opening after or during the deflection. The cleaning opening can serve for cleaning the conveying element by way of this.

In particular, dust, wear debris and other material, driven by gravity, falls through the cleaning opening. Pressure or a vacuum can alternatively and/or additionally create or assist the movement through the cleaning opening.

Several cleaning openings are formed on the braking device and/or on the braking surface, for example.

The slot on the braking device and/or the braking surface can have a longitudinal axis that is aligned at an angle of 45 degrees relative to the conveying device of the conveying element.

The angle can also be 90 degrees relative to the conveying direction of the conveying element, thus the slot aligned transversely to the conveying direction of the conveying element. An angle of between about 45 degrees to 90 degrees is possible. In particular, an angle of between about 5 degrees to 45 degrees is possible.

The slot in particular is 2 to 20 mm wide. The slot can be 3 to 10 mm wide. In particular, the slot is 4-7 mm wide. The slot can be 4-5 mm wide.

The braking device and/or a braking surface, in a region below a cleaning opening can form and/or hold a capture device for dust, wear debris and other material.

As an optional feature, the conveying device includes a control device that is designed for the controlled movement of the essentially bent braking surface.

The control device permits a controlled movement of the braking surface relative to the conveying device. The movement of the braking surface thereby superimposes on a movement of the conveying element. The movements of the braking surface and of the conveying element thus sum. The movement of the braking surface can be effected in the movement direction of the conveying element or counter to the movement direction of the conveying element. With a suitable movement of the braking surface, its movement relative to the conveying element can be selected in a controlled manner by way of this. The braking effect of the braking surface, which acts upon the conveying element and which is exerted by the sliding friction, can be selected in a controlled manner by way of the relative movement that can be selected in a controlled manner.

The control device, for example, can be designed as a driven and axially rotatably mounted roller, whose outer surface comprises the braking surface.

The conveying device can also be free of a control device, so that the braking surface can be moved freely of a control.

The bent braking surface is spatially fixed as a further optional feature.

The braking device can include a spatially fixed braking surface. This means that the braking surface can retain a fixed spatial position. The braking surface is stationary and does not move in this case. The spatially fixed braking surface has a contact fit with the conveying element. The conveying element on conveying slides over the spatially fixed braking surface and is subjected to a sliding resistance due to the sliding friction. This sliding resistance caused by sliding friction at least partly causes the braking effect upon the driven conveying element.

Spatially fixed braking surfaces can be manufactured in a simple and inexpensive manner. These are also robust. The maintenance and replacement can also be carried out in a simple, inexpensive and time-saving manner In an embodiment of the braking device, the bent braking surface is designed as part of a surface of a radial sector of a cylinder or as part of a surface of a cylinder.

The cylinder can have a circularly round cross section. The cylinder, for example, can also have an oval cross section.

The cylinder in particular can be designed as a hollow cylinder (thus as a tube).

The embodiments of the braking device, in which the bent braking surface is designed as part of a surface of a cylinder, of a hollow cylinder or of a radial sector of the cylinder or of the hollow cylinder, are simple and inexpensive to manufacture. Thereby, one can particularly profit from the fact that cylinders are already manufactured in large numbers for different, other purposes and are inexpensively available, in different sizes, shapes, natures, surface coatings, with different cross sections and from different materials. An assembly and/or replacement are also simple, and can be simply effected, for example, by way of translation in the direction of the cylinder axis.

The bent braking surface can also be designed as a shaped flat material. The bent braking surface in particular can be designed as bent flat material.

A flat material such as a sheet or a plate can for example be shaped into the bent braking surface. A starting material in a sheet-like or flat shape can thus form the bent braking surface after a suitable shaping machining.

An embodiment of the braking device with a braking surface designed as a shaped flat material can be manufactured in a rapid, simple and/or inexpensive manner depending on the material characteristics of the flat material and the demands placed upon the bent braking surface.

The capture device in particular can be designed as shaped flat material. The capture device, for example, is formed from the same piece of flat material as the bent braking surface.

The braking device can alternatively comprise a bent braking surface, which is already manufactured in its final bent shape, without any shaping and/or material-removing post-machining.

The bent braking surface, for example, can be manufactured with a cast mould, a press mould, template/pattern or amid the use of a fixation device. The bent braking surface can for instance be formed by sintering ceramic and/or metal, by way of curing plastics and/or composite materials (in particular fibre-reinforced composite material), cast metal and/or additive manufacturing methods (e.g. layer-wise construction by way of successively applying individual material layers onto one another or 3D printing or 3D modulation methods).

In particular, the capture device can already be manufactured into its final bent shape without shaping post-machining and/or material-removing post-machining The bent braking surface can also be manufactured in different regions with the different methods described above. A region of the same bent braking surface, for example, can be formed from a radial sector of a hollow cylinder, a further region from shaped flat material and a further region from cast metal.

Analogously, it is also the case with the capture device, that different regions can be manufactured with different ones of methods described above.

The bent braking surface and the capture device can also be manufactured or formed in the same manner. Or the bent braking surface and the capture device are manufactured or formed in different manners.

The capture device in particular can simultaneously be manufactured with the bent braking surface in the same manner. The capture device and the bent braking surface for example can be designed as one piece.

As a further optional feature, the angle of wrap of the braking surface is at least 90 degrees. In particular, the wrap angle of the braking surface is at least 180 degrees and in particular at least 200 degrees.

A large braking effect can be achieved by an angle of wrap of at least 90 degrees. This is accordingly also the case for wrap angles of at least 180 degrees or at least 200 degrees. This high braking effect can moreover be achieved in a small space. The braking device can therefore be designed in a compact manner.

The braking surface is optionally arranged in a rear head-end region, in which the conveying element is deflected from the return section into the conveying section.

On the one hand the braking effect of the braking surface can be utilised, and on the other hand a direction change of the conveying element through the braking device can be simultaneously effected, due to an arrangement of the braking surface in the rear head-end region. This permits a compact design of the conveying device with few components.

The braking surface can alternatively be arranged in the return section. This, for example, can be advantageous if little space is available in the rear head-end region.

The braking surface is designed as a deflection of the conveying element into the conveying section, as a further optional feature.

The braking surface in this manner can serve simultaneously as a brake and a deflection of the conveying element from the return section into the conveying section. The conveying device requires less individual parts due to this, and can be more simply designed and less expensively manufactured.

The braking surface, however, can also deflect the conveying element, without deflecting it directly into the conveying section. The braking surface, for example, can carry out only a part of the deflection of the conveying element into the conveying section (thus without a last part of the deflection directly into the conveying section, said deflection being effected by means other than the braking surface). This can be advantageous, for example, if wear debris arising due to the sliding friction is to occur spatially remotely from the conveying section. In this manner, a development of noise due to the braking surface can, for example, be minimised and/or damped in a targeted manner.

The braking surface can however also not participate in the deflection of the conveying element into the conveying section. The same advantages as have been described in the above paragraph are also valid here.

In an embodiment variant, the conveying device includes a drive device that is designed such that it drives the conveying element by way of positive fit and/or friction fit, at a location that is arranged downstream of the conveying section as well as upstream of the braking device, in the movement direction of the conveying element.

The drive device can thereby in particular be arranged in the front head-end region. The drive device can even carry out the deflection of the conveying element from the conveying section into the return section. Conveying devices that are designed in such a manner have a compact construction manner.

The drive device acts counter to the braking device. The conveying element in this manner can be subjected to a tension between the drive device and the braking device. The conveying surface in the conveying section can be subjected to tension in a controlled manner and according to requirements on account of this.

However, it is also possible for the conveying device to be designed without its own drive. The conveying device, for example, can be operated passively by way of already present kinetic energy of the objects/subjects to be conveyed, and/or by way of gravitational force.

The braking device as an optional feature includes a preliminary brake that is arranged upstream of the braking surface in the movement direction of the conveying element and exerts a braking effect upon the conveying element.

A preliminary brake can exert a braking force upon the conveying element additionally to the essentially bent braking surface. The preliminary brake and the braking surface, for example, can complement one another with regard to their braking force and in particular amplify this braking force. The preliminary brake for example can be arranged in a manner such that the wrap angle of the braking surface corresponds to a certain size (by which means the braking surface reinforces the braking effect of the preliminary brake similarly to a belt brake). The preliminary brake can be designed for relatively small braking forces and in combination with the essentially bent braking surface effect a high braking force upon the conveying element. Such a braking device has a high braking force, is designed in a simple and stable manner and can be inexpensively manufactured and operated.

The conveying device however can also be designed without a preliminary brake.

The preliminary brake can include a preliminary brake body that is designed and arranged such that it exerts pressure upon an extensively-surfaced formed side of the conveying element, presses the conveying element against a preliminary brake counter-body and by way of this brakes the conveying element by way of sliding friction.

The sliding friction in the preliminary brake that acts upon the conveying element can, for example, arise by way of the sliding friction of the conveying element with the preliminary brake body. The sliding friction acting upon the conveying element, in the preliminary brake can however also arise, for example, by way of sliding friction of the conveying element with the preliminary braking counter-body. The sliding friction acting upon the conveying element in the preliminary brake can also arise due to a sliding friction of the conveying element with the preliminary brake body as well as with the preliminary brake counter-body.

Such a preliminary brake can be manufactured simply and inexpensively for relatively small braking forces. The preliminary brake however can also be designed differently, for example without a preliminary brake body, and/or in a manner exerting the pressure upon a short side and/or an edge of the conveying element.

As a further optional feature, the preliminary brake can include a setting or adjusting device for changing the pressure that is exerted by the preliminary brake body upon the side of the conveying element, which is formed in an extensively-surfaced manner.

A setting device for varying the pressure exerted upon the conveying element permits a good control of the conveying device. The tension upon the conveying element in the conveying section can be [closed-loop] controlled, for example. The setting device in particular can be designed in a self-regulating manner, so that the tension is kept constant in the conveying section.

The conveying device however can also be designed with a preliminary brake without a setting device.

Optionally, the preliminary brake engages on the conveying element at two regions of the conveying element, wherein these regions are distanced to one another transversely to the movement direction of the conveying element. In particular, the preliminary brake engages on the conveying element at two regions of the conveying element which are arranged on opposite edges of the conveying element.

These points of engagement of the preliminary brake on the conveying element and which are distanced to one another permit a targeted spatial variation of the braking force. The conveying element, for example, can be guided in a targeted manner by way of this.

The preliminary brake however can also engage on the conveying element at only one coherent region of the conveying element. The preliminary brake, for example, can also however engage on the conveying element in more than two regions of the conveying element.

In an embodiment, the braking device includes several essentially bent braking surfaces that are arranged one after the other in the movement direction of the conveying element.

The advantages of an individual, essentially bent braking surface are already described further above. The breaking effect can be reinforced in a non-linear manner by way of a combination of several braking surfaces arranged one after the other. A compact construction manner can also be achieved. Such a design is moreover stable and inexpensive.

The conveying device can also include only a single, essentially bent braking surface.

Optionally, the several essentially bent braking surfaces can be arranged successively in the movement direction of the conveying element, on sides of the conveying element, which are designed in an extensively-surfaced manner and which are opposite in each case.

This arrangement leads the conveying element between the essentially bent braking surfaces in a meandering or serpentine manner. The essentially bent braking surfaces can be arranged in a space-saving manner and in a manner mutually reinforcing one another with regard to the braking effect, in this manner. Many variations are possible due to specific, mutual spatial arrangements.

Alternatively, at least two consecutive braking surfaces can be arranged in each case on the same side of the conveying element. The conveying element in this manner can be deflected several times in the same direction and simultaneously braked, for example.

As a further optional feature, the conveying device includes an extensively-surfaced support of a part of the conveying element in the conveying section in the gravitation direction, wherein the extensively-surfaced support in particular comprises slide rails.

The conveying element can be led in a sliding manner e.g. on slide rails, for supporting the conveying element in the region of the conveying section between the deflection locations, in which region the conveyed article lies on the conveying element. Conveying devices with which the conveying element is supported in a rolling manner between the deflection locations are also possible.

The conveying device can also be supported by a support, which supports the conveying device in a pointwise manner instead of a surfaced manner. The conveying device can also designed free of a support.

The conveying device described above in particular is designed as a worker-rider belt.

BRIEF DESCRIPTION OF THE DRAWINGS

The subject-matter of the invention is hereinafter described in more detail by way of preferred embodiments which are represented in the accompanying drawings. In each case are schematically shown in:

FIG. 5 a perspective view of a part of the fourth embodiment of the conveying device;

FIG. 6 an enlarged detail of FIG. 5;

FIG. 7 a view from above, onto an application of the conveying device as a worker-rider belt;

DETAILED DESCRIPTION OF THE DRAWINGS

Figure 1:
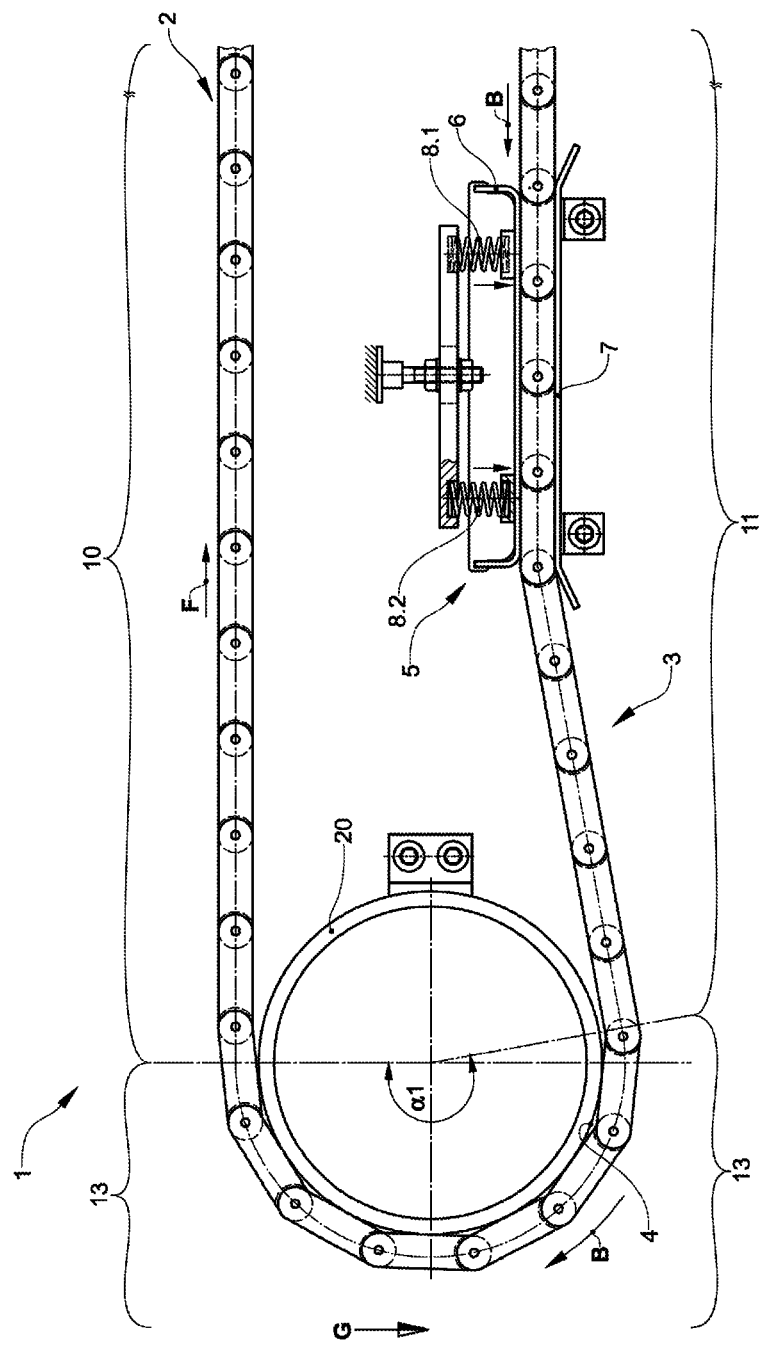
FIG. 1 a lateral view of a part of a first embodiment of the conveying device.

Basically, the same parts in the figures are provided with the same reference numerals. The gravitation direction G in all figures indicates which elements are at the top and which are at the bottom.

Figure 2:
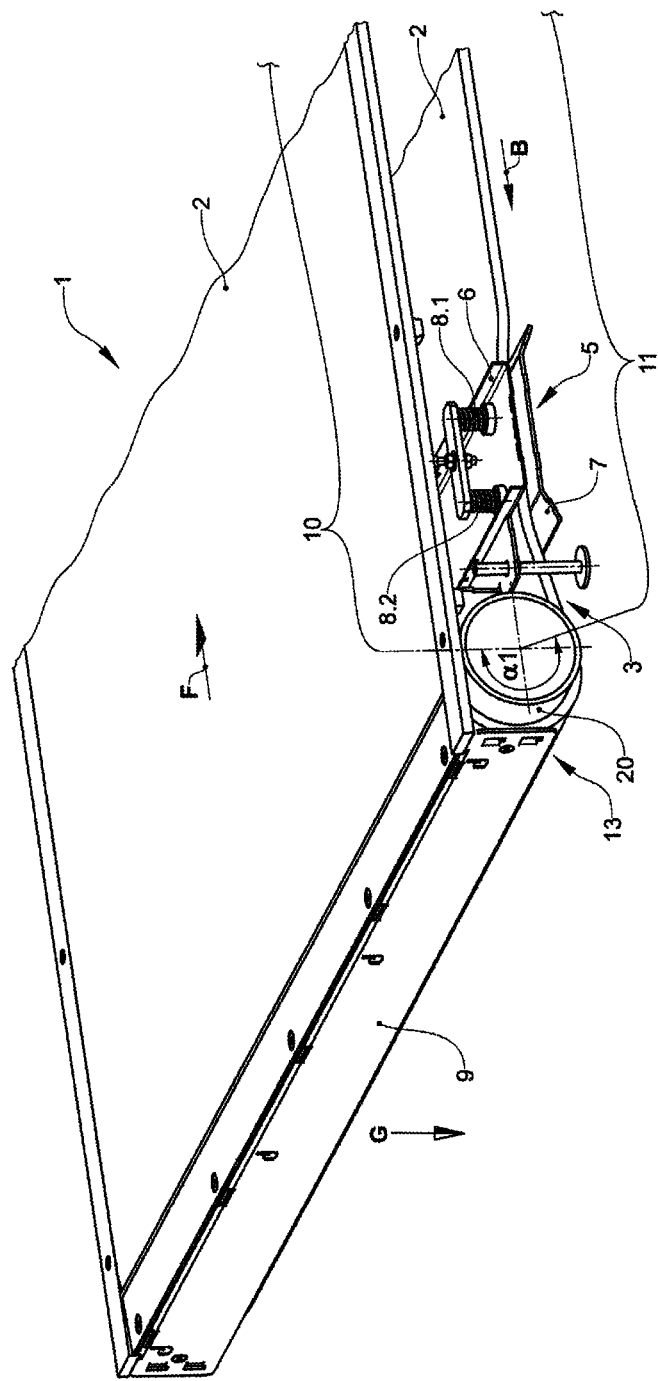
FIG. 2 a perspective view of a part of the first embodiment of the conveying device.

FIGS. 1 and 2 show a first embodiment of a conveying device 1. Only a few parts of the conveying device 1 are represented in FIG. 1, for an improved understanding of the manner of functioning of the conveying device 1. FIG. 1 in a lateral view shows a part of the conveying element 2, as well as a braking device 3, which comprises a braking surface 4 and a preliminary brake 5. The preliminary brake 5 in turn comprises a preliminary brake body 6 and a preliminary brake counter-body 7.

The braking surface 4 is designed as part of an outer surface of a hollow cylinder 20. The hollow cylinder 20 has a circularly round and annular cross section. The braking surface 4 is thus uniformly bent. The hollow cylinder 20 is fastened on the conveying device 1 in a stationary, rotational fixed and translation-fixed manner, and is thus fixed. The conveying element 2 is designed as a mat chain and wraps the hollow cylinder 20 with an angle of wrap α1. The conveying element 2 can come into contact with the braking surface 4, which is designed as part of the outer surface of the hollow cylinder 20, within this wrap angle α1.

A part of the conveying element 2 that lies at the bottom moves in the movement direction B of the conveying element 2 firstly through the preliminary brake 5 and then moves to the braking surface 4. The part of the conveying element 2 that lies at the bottom is thus located in a return section 11 until the beginning of the braking surface 4, and thus until the beginning of the wrap angle α1. The angle of wrap α1 in FIG. 1 is 190 degrees.

In FIG. 1, the braking surface 4 not only exerts a braking effect upon the conveying element 2 by way of sliding friction, but also simultaneously serves as a deflection of the conveying element 2 from the return section 11 into a conveying section 10. The conveying element 2 is located in the region of the braking surface 4 (in other words along the angle of wrap α1), thus in a rear head-end region 13.

On operation of the conveying device 1, the conveying element 2 in FIG. 1 thus firstly moves in the movement direction B of the conveying element 2 through the return section 11, subsequently through the rear head-end region 13 and subsequent to this through the conveying section 10. The movement direction B of the conveying element 2 in the conveying section 10 corresponds to the conveying direction F.

The preliminary brake 5 in the first embodiment of the conveying device 1 exerts the braking force upon the conveying element 2 by way of sliding friction. For this, the preliminary brake body 6 presses from above onto an upper, extensively-surfaced side of the conveying element 2, by which means the conveying element 2 with its lower extensively-surfaced side is pressed from above against the preliminary brake counter-body 7. The preliminary brake body 6 as well as the preliminary brake counter-body 7 are fastened on the conveying device 1 in an immovable manner in the movement direction B of the conveying element 2, by which means the conveying element 2 can be moved past this amid the occurrence of sliding friction.

The preliminary brake body 6 is biased downwards against the conveying element 2 by way of pressed-together helical springs 8.1, 8.2, so that the preliminary brake body 6 presses from above against the conveying element 2 with a constant pressure. The helical springs 8.1, 8.2 can be pressed together to a greater or lesser extent by way of a design adjustable by way of a screw thread, by which means the pressure of the preliminary brake body 6 upon the conveying element 2 and thus the braking effect of the preliminary brake 5 (and by way of this, also of the complete braking device 3) can be manually set.

The conveying element 2, after it has passed the preliminary brake 5, slides over the brake surface 4 and is additionally braked by way of this. The braking effect of the preliminary brake 5 upon the conveying element 2 is reinforced by the sliding friction of the braking surface 4. The conveying element 2 has no tension or pretension upstream of the preliminary brake 5 in the movement direction B of the conveying element 2. The conveying element 2 on account of the preliminary brake 5 and the braking surface 4 is subjected to a braking force, which on conveying objects/subjects in the conveying section 10 subjects to conveying element 2 to tension in the conveying section 10.

The tension on the conveying element 2 in the conveying section 10 is not retained if the conveying device 1 is not in operation. The conveying element 2 is thus free from tension in the conveying section 10, when not in operation. At least a part of the conveying element 2 is not under tension on operation of the conveying device 1 as well as when not in operation.

A perspective view of the first embodiment of the conveying device 1 is represented in FIG. 2. As in FIG. 1, only a part of the conveying device 1 is shown for reasons of a simpler representation. The conveying element 2 in FIG. 2 is represented in a simplified manner as a belt (without a detailed representation of the individual links of the mat chain). FIG. 2 apart from the parts which are represented in FIG. 1, additionally comprises an angular cover 9 of the rear head-end region 13. The cover 9 covers the conveying element 2 in the rear head-end region 13 to the top and partly at its face side.

Figure 3:
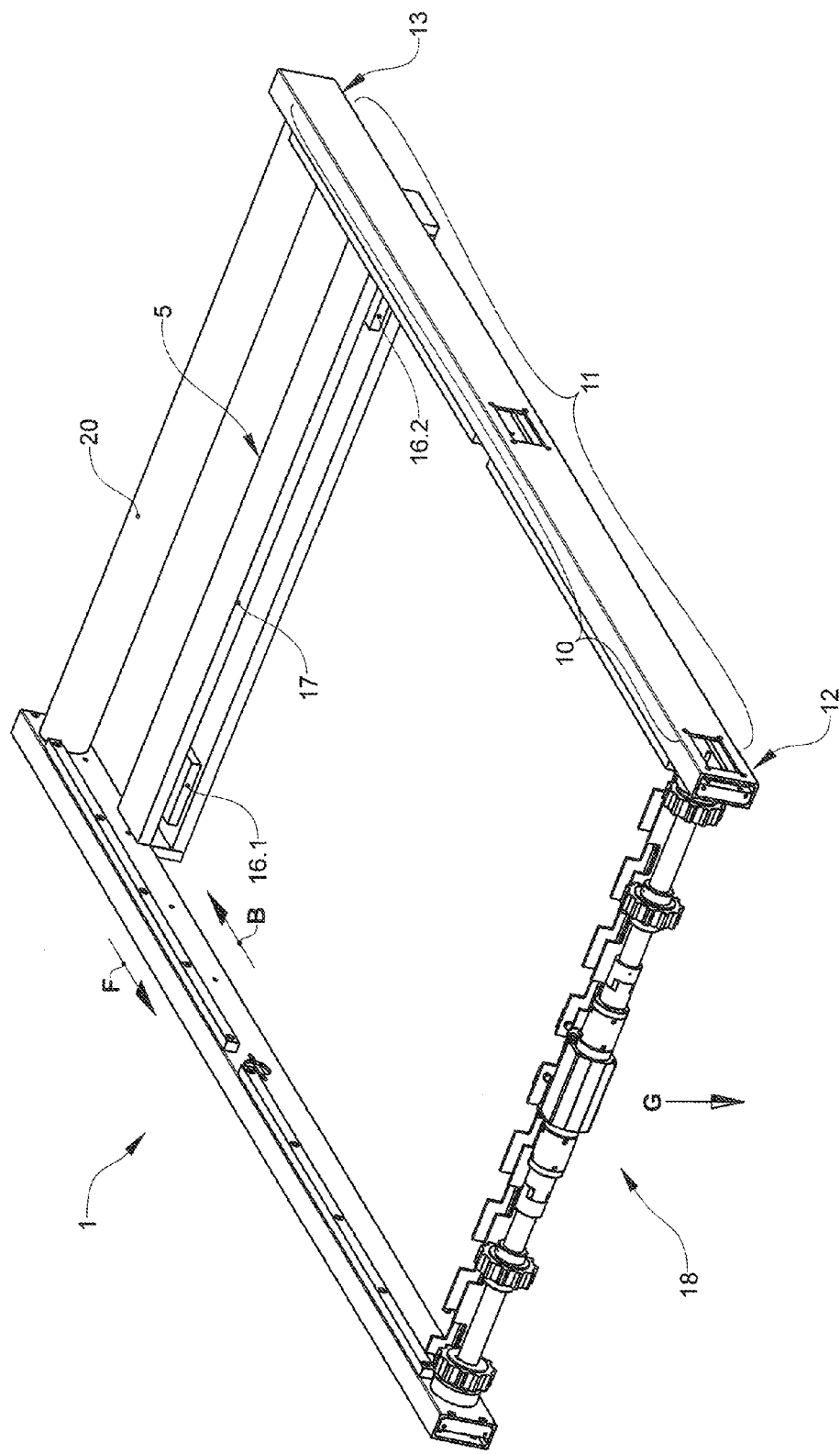
FIG. 3 a perspective view of a part of a second embodiment of the conveying device FIG. 4 a lateral view of a part of a third embodiment of the conveying device.

FIG. 3 shows a perspective view of a part of a second embodiment of the conveying device. Again, only certain parts of the conveying device 1 are shown for reasons of a simpler representation. The conveying element 2 is not represented in FIG. 3, but its movement direction B as well as the conveying direction F. Instead, in contrast to FIGS. 1 and 2, a front head-end region 12 is represented in FIG. 3 and this is designed the same for the first and the second embodiment. The front head-end region 12 comprises a drive device 18, which is designed as a shaft driven by an electric motor and is with cogs engaging into the conveying element 2. The drive device 18 thereby simultaneously serves for the deflection of the conveying element 2 from the return section 11 into the conveying section 10.

The single difference between the first embodiment represented in FIGS. 1 and 2 and the second embodiment represented in FIG. 3 lies in the design of the preliminary brake 5. The preliminary brake 5, although again comprising a preliminary brake counter-body 17, however in this case comprises two preliminary brake bodies 16.1, 16.2. Moreover, the preliminary brake bodies 16.1, 16.2 are arranged below the conveying element 2, and the preliminary brake counter-body 17 above the conveying element 2. The conveying element 2 is thus not pressed downwards by the preliminary brake 5, but upwards (against the preliminary brake counter-body 17 serving as an abutment). In the second embodiment too, the preliminary brake bodies 16.1, 16.2 as well as the preliminary brake counter-body 7 are fastened on the conveying device 1 in an immovable manner in the movement direction B of the conveying element 2, by which means the conveying element 2 can be moved past this amid the occurrence of sliding friction.

The two preliminary brake bodies 16.1, 16.2 are each arranged on edges of the conveying element 2 that are opposite one another transversely to the movement direction of the conveying element. Thereby, the preliminary brake bodies 16.1, 16.2 in the movement direction B of the conveying element 2 are arranged on the conveying element at the same height. Thus, the preliminary brake 5 engages on the conveying element at two regions of the conveying element that are spaced from one another transversely to the movement direction B of the conveying element 2. Expressed more precisely, the preliminary brake 5 engages on the conveying element 2 at two opposite edges of the conveying element 2.

The representation of a setting device for changing the pressure exerted by the preliminary brake bodies 16.1, 16.2 upon the extensively-surfaced formed side of the conveying element 2 has been omitted in FIG. 3, although the second embodiment of the conveying device 1 comprises such.

Figure 4:
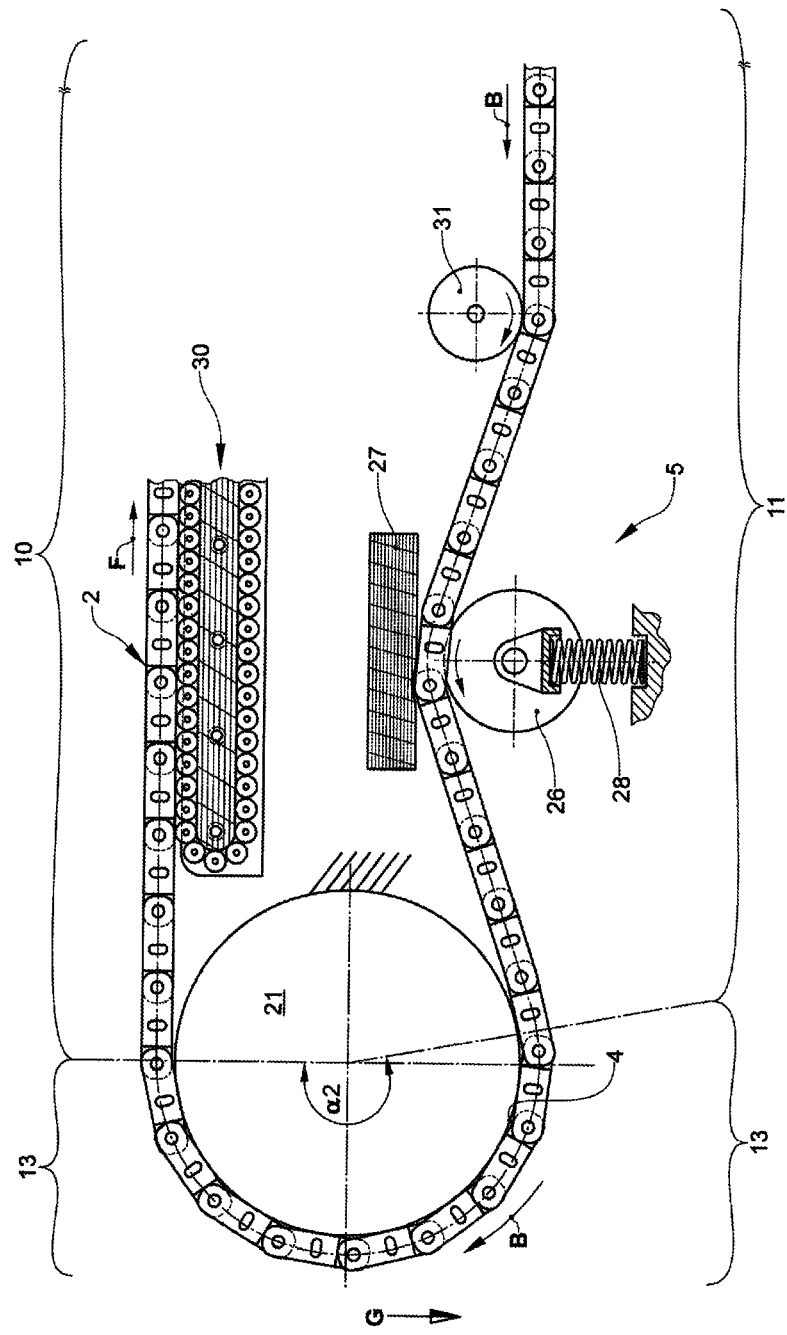

FIG. 4 shows a lateral view of a part of a third embodiment of the conveying device. The third embodiment in turn comprises a conveying element 2, which is designed as a mat chain. However, the links of the mat chain are somewhat shorter in comparison to the first and the second embodiment. Whereas with the first and second embodiment, seven links of the mat chain could simultaneously wrap the braking surface 4 for instance, with the third embodiment about nine links of the mat chain can simultaneously wrap the braking surface 4. In the third embodiment, the angle of wrap α2 however turns out to be slightly larger at 200 degrees.

The braking surface 4 is designed as part of an outer surface of a cylinder. The cylinder 21 however in contrast to the first and second embodiment is solid and not designed as a hollow cylinder. The cylinder 21 however is also fastened on the conveying device 1 in a rotationally fixed, rotary-fixed and translatorily fixed manner.

A further difference of the third embodiment to the first and second embodiment lies in the preliminary brake 5, with which the preliminary brake body 26 is designed as a rotatably mounted roller. The preliminary brake body 26 is arranged below the conveying element 2, as in the second embodiment. The conveying element 2 is pressed by the preliminary brake body 26, thus by pressure from below, upon an extensively-surfaced formed lower side, upwards against a lower side of the preliminary brake counter-body 27. The conveying element 2 in the preliminary brake 5 thus by way of the preliminary brake counter-body 27 is subjected to a braking effect arising due to sliding friction, only on its upper side formed in an extensively-surfaced manner. The preliminary brake body 26 co-rotates with the conveying element 2 in the case of movement.

The preliminary brake body 26 in FIG. 4 is biased by a pressed-together helical spring 28, analogously to the preliminary brake body 6 of the first embodiment. Moreover, a rotatably and stationarily mounted guide roller 31 is arranged upstream of the preliminary brake 5 in the movement direction B of the conveying element 2, in the third embodiment. This guide roller 31 presses the conveying element from the top to the bottom below a fixed maximal height in the gravitation direction. The conveying element 2 in this manner is guided in the return section 11 of the conveying device 1 and is led to the preliminary brake 5 at a fixed angle, which permits the braking effect of the preliminary brake 5 to be kept constant. The guide roller 31 can reduce or eliminate vibrations and fluctuations of the conveying element 2 in the return section 11.

The conveying device 1 moreover in the third embodiment comprises a support 30 of the conveying section 10. The support 30 is thereby designed in an extensively-surfaced manner and comprises a roller mat that is peripheral around a central support body and upon which the conveying element 2 is supported from above in a part of the conveying section 10.

FIG. 5 shows a perspective view of a part of a fourth embodiment of the conveying device. The difference between the fourth embodiment in FIG. 5 and the second embodiment in FIG. 3 lies in the fact that the braking surface 4 is not designed as part of an outer surface of a complete hollow cylinder 20, but as part of an outer surface of half a hollow cylinder 22. Thereby, the half hollow cylinder 22 is halved in the longitudinal direction and in other words can be indicated as a half tube. The term "half" in this context is to be understood more broadly than a half in the mathematic or geometric sense. Here for example, an angle of more than 180 degrees is also to be understood as "half". A region between a quarter and three quarters in the broadest context can also be understood as "half", thus from 90 degrees to 270 degrees.

In FIG. 5, the half hollow cylinder 22 corresponds to a radial sector of a circularly round hollow cylinder with a circumference of the wrap angle α1 (thus here 190 degrees). The hollow cylinder half 22 is arranged in the rear head-end region 13 in a manner such that a part of its outer surface simultaneously serves as a braking surface 4 and as a deflection for a conveying element 2, from the return section 11 into the conveying section 10.

FIG. 6 shows an enlarged detail from FIG. 5. The hollow cylinder half 22, on whose outer surface the braking surface 4 is formed, can be recognised more clearly therein.

A view from above upon an application of the conveying device 1 as a worker-rider belt is represented in FIG. 7. Thereby, a conveying device 1 is arranged on one side of a worker-rider belt 40 in each case. Automobiles, for example, are conveyed on the working belt 40 and are simultaneously worked on by personnel described as workers. The workers can stand on the conveying devices 1 on both sides of the working belt 40 and, standing thereon, are co-moved with the working belt 40 with the same speed and with the same direction, thus at a relative spatial standstill to the working belt 40. For this, the conveying directions F of the conveying devices 1 and the conveying direction F' of the working belt 40 are directed in the same direction, and the movement speeds of the conveying elements 2 of the conveying devices 1 are adapted to the moving speed of the working belt 40.

Figure 8:
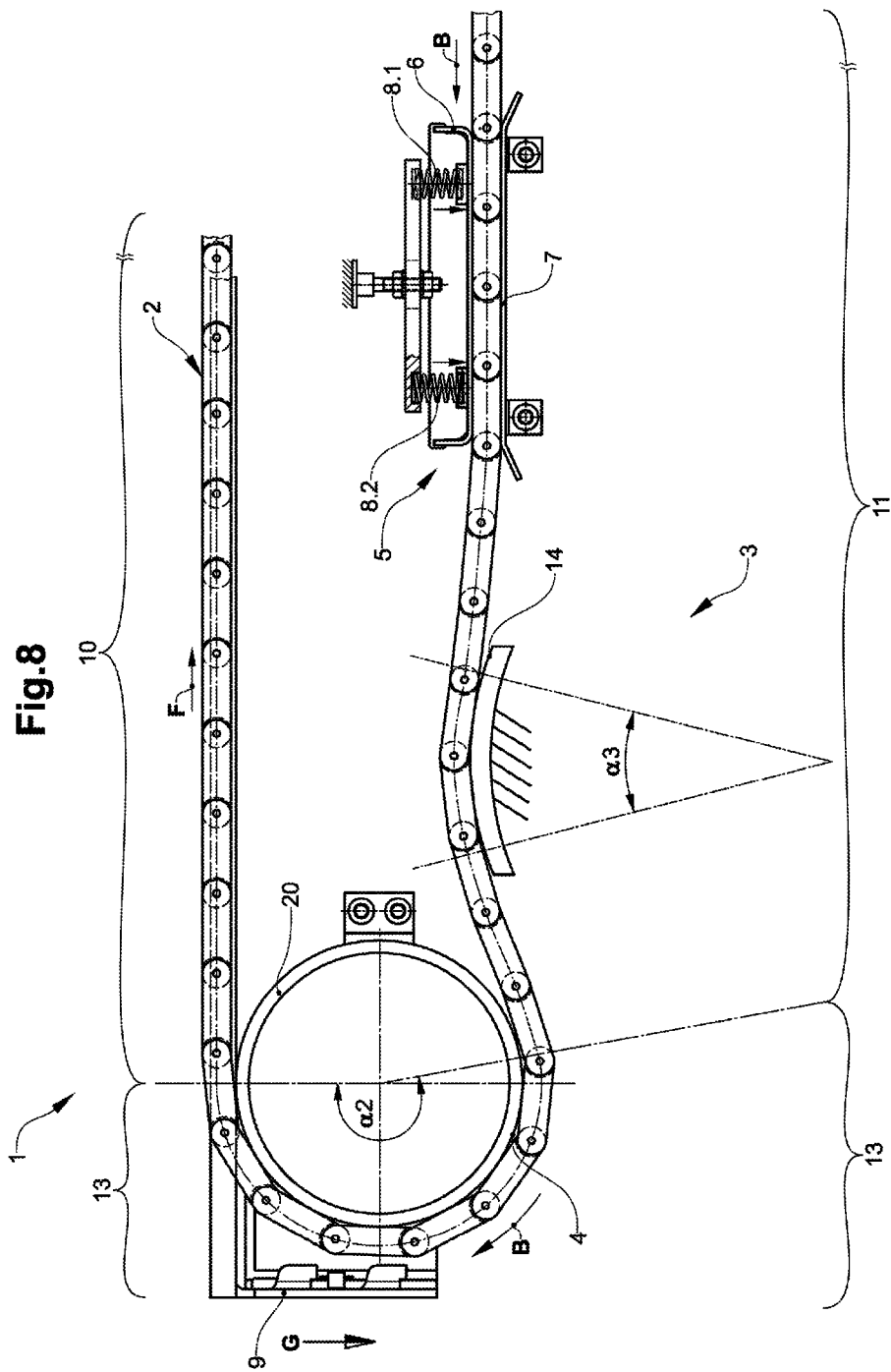
FIG. 8 a lateral view of a part of a fifth embodiment of the conveying device.

A lateral view of a part of a fifth embodiment of the conveying device is represented in FIG. 8. This fifth embodiment differs from the first embodiment by way of the fact that an additional and essentially bent braking surface 14 is arranged between the preliminary brake 5 and the hollow cylinder 20, on whose outer surface the essentially bent braking surface 4 is formed. The fifth embodiment thus comprises two essentially bent braking surfaces 4, 14 as well as the preliminary brake 5.

The fifth embodiment is an example of a conveying device 1 with several essentially bent braking surfaces 4, 14. The conveying element 2 runs in the movement direction B of the conveying element 2 from the preliminary brake 5, directly over the essentially bent additional braking surface 14, to the essentially bent braking surface 4. The latter also serves as a deflection of the conveying element 2 into the conveying section 10.

The bend of the essentially bent additional braking surface 14 as a shape has a circular arc (and thus has a uniform bending). The essentially bent additional braking surface 14 is encompassed by an outer surface of a radial sector of a hollow cylinder. This radial sector of a hollow cylinder is fastened on the conveying device 1 in a stationary, rotationally fixed and translatorily fixed manner and is thus fixed.

The essentially bent additional braking surface 14 is thereby arranged spatially relative to the essentially bent braking surface 4, in a manner such that the wrap angle α2 of the essentially bent braking surface 4 is 200 degrees, as in the third embodiment, and the wrap angle α3 of the essentially bent additional braking surface 14 is about 35 degrees.

The essentially bent braking surface 4, which is encompassed by the outer side of the hollow cylinder 20, is arranged within the closed conveying element 2 and applies its braking effect, which is at least partly based of sliding friction, upon an inner side of the conveying element 2, which is formed in an extensively-surfaced manner. The essentially bent additional braking surface 14 applies its braking effect based at least partly on sliding friction, upon an extensively-surfaced formed outer side of the conveying element 2. The essentially bent braking surface 4 and the essentially bent additional braking surface 14 are arranged one after the other in the movement direction of the conveying element 2 as well as on sides of the conveying element 2 which lie opposite in each case and which are formed in an extensively-surfaced manner. The conveying element 2 thus moves in a serpentine manner between the two essentially bent braking surfaces 4, 14.

Figure 9:
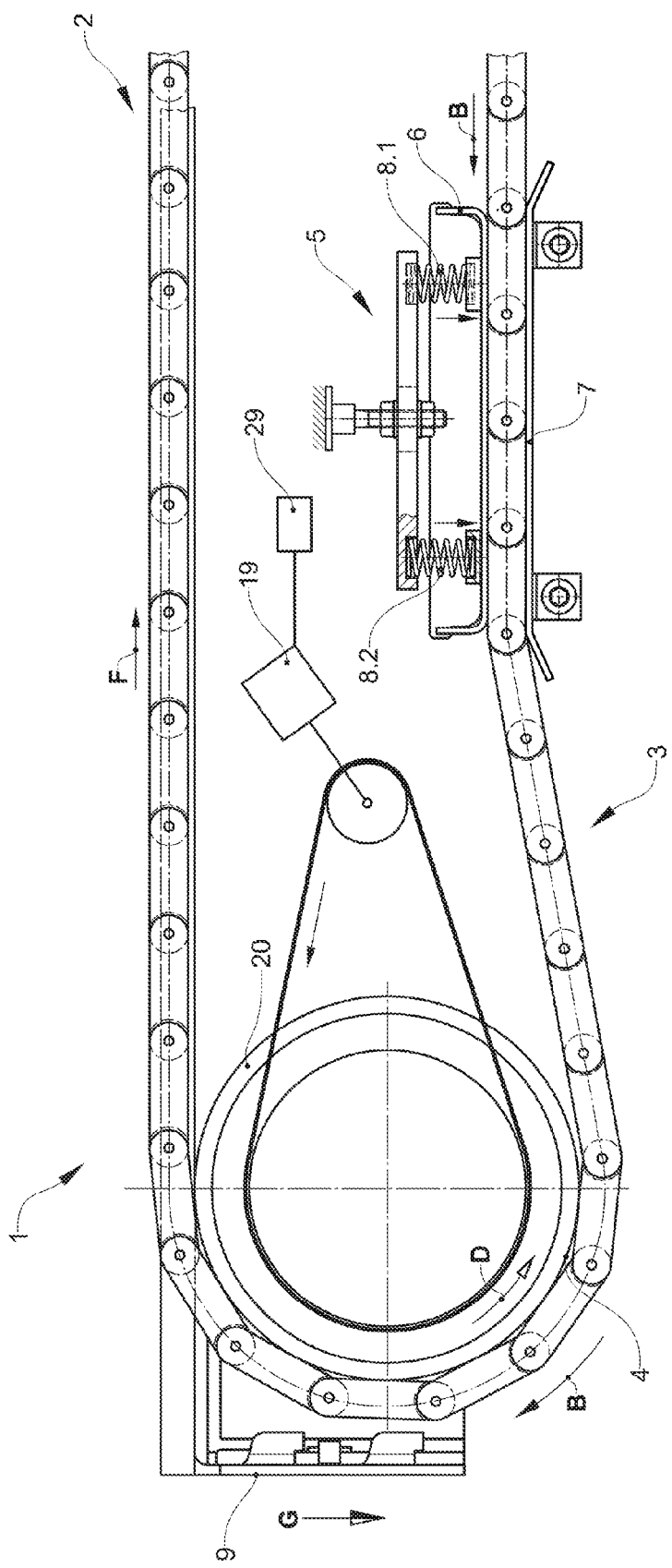
FIG. 9 a lateral view of a part of a sixth embodiment of the conveying device.

FIG. 9 shows a lateral view of part of a sixth embodiment of the conveying device 1. The sixth embodiment differs from the first embodiment in that the essentially bent braking surface 4 can be moved in a controlled manner. For this, the sixth embodiment of the conveying device 1 comprises a control device 29, and the hollow cylinder 20, the outer surface of which encompasses the essentially bent braking surface 4, is rotatably mounted about its longitudinal axis. The control device 29 controls a motor 19 that drives the hollow cylinder 20 and permits this to rotate about its longitudinal axis. The essentially bent braking surface 4 in this manner moves in a controlled manner in a movement direction D of the essentially bent braking surface 4.

Figure 10:
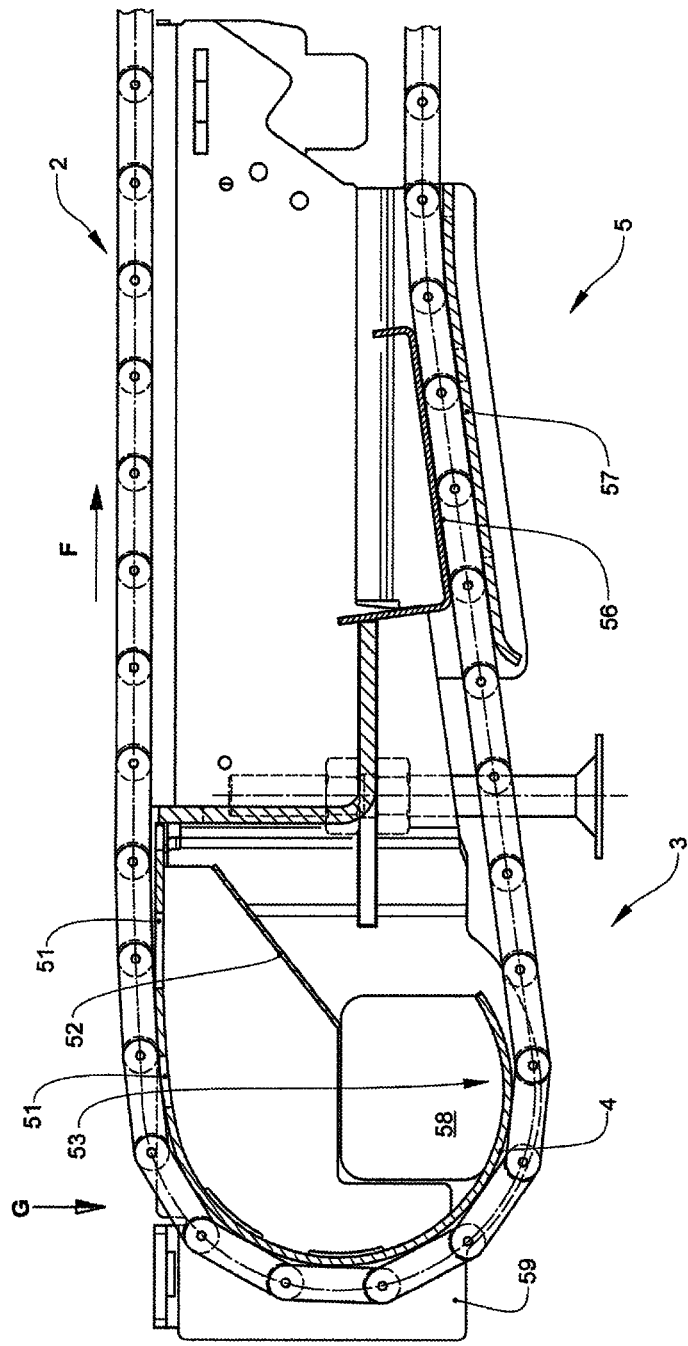
FIG. 10 a lateral view of a part of a seventh embodiment of the conveying device.
Figure 11:
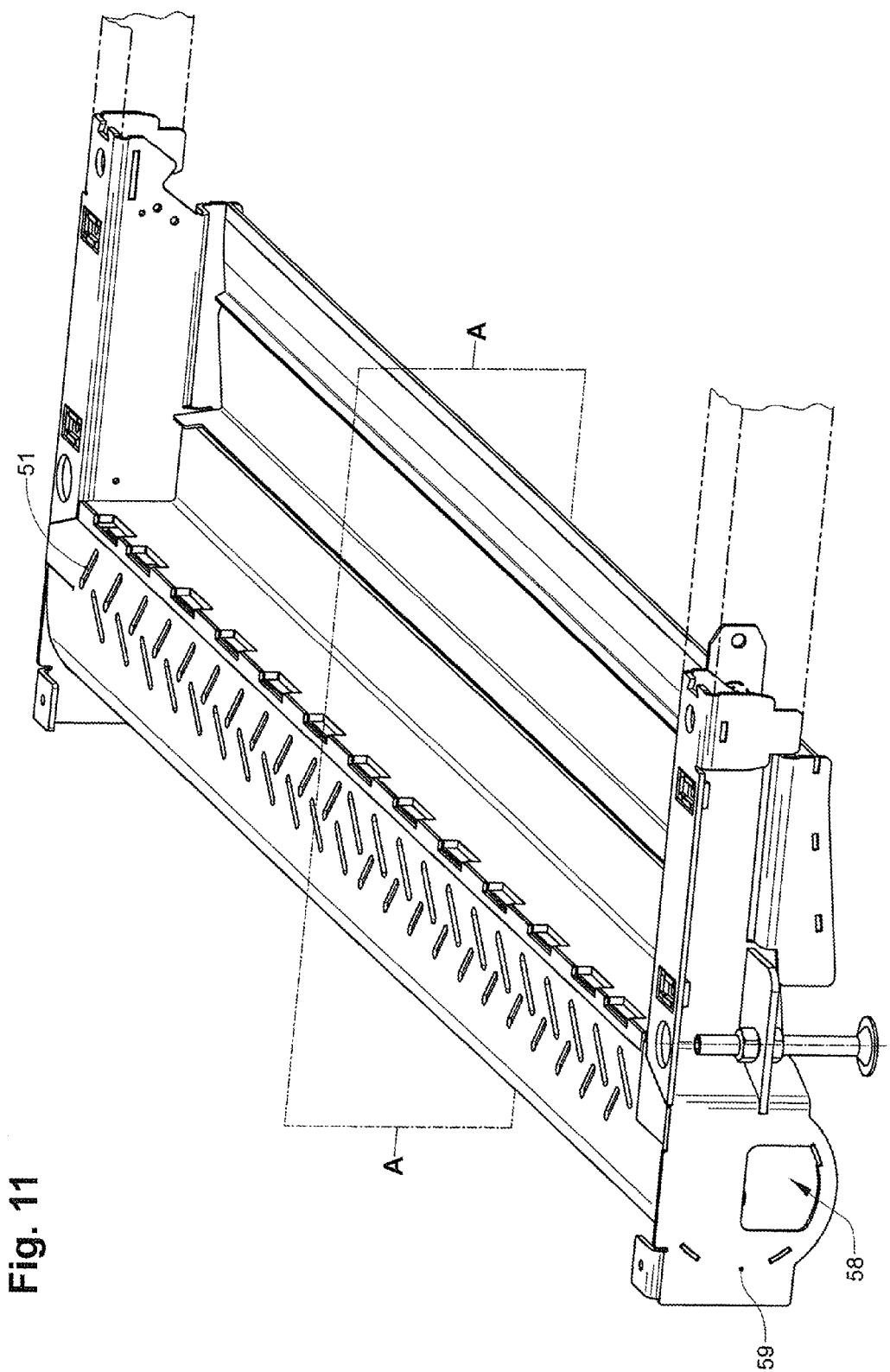
FIG. 11 a perspective view of a part of a seventh embodiment of the conveying device.

A lateral view of a part of a seventh embodiment of the conveying device is represented in FIG. 10. This seventh embodiment is represented in FIG. 11 in a perspective view, wherein the conveying element 2 is not drawn for reasons of a simpler representation. Thereby, the lateral view in FIG. 10 corresponds to a section along the plane A-A which is drawn in FIG. 11.

The seventh embodiment of the conveying device 1, as is well evident in FIG. 10, apart from the preliminary brake 5 with the preliminary brake body 56 and the preliminary brake counter-body 57, comprises the braking device 3. The bend of the bent braking surface 4 of the braking device 3 has a constantly reducing curvature downstream in the conveying direction F. The braking device 3 in this manner forms a capture device 53 in the lower region of the braking surface 4 and upstream in the movement direction of the conveying element 2. The braking device 3 moreover in the upper region of the braking surface 4 and downstream in the movement direction of the conveying element 2 forms a levelling-off end region which at its end which is situated downstream in the movement direction of the conveying element 2, is directed slightly downwards away from the conveying element 2.

A collection slide 52 is arranged above the capture device 53 in a manner such that material that is driven by gravity is led from the collection slide 52 into the capture device 53. In turn, cleaning openings in the form of slots 51 are formed in the braking device 3 or in the braking surface 3, above the collection slide 52 and above the capture device 53.

The slots 51 are arranged in a manner such that dust, wear debris and other material can fall through the slots 51 in a manner driven by gravity. Dust, worn debris and other material thereby fall directly into the capture device 53 or onto the collection slide 52, which leads this further into the capture device 53. The capture device 53 thus serves for the collection of dust, wear debris and other material which falls through the slots 51. A cleaning opening 58, which permits an access to the capture device 53 is formed in the cover 59. Dust, wear debris and other material can be removed from the capture device 53 through the cleaning opening 58 and this capture device can be emptied.

The slots 51 can clearly be seen in FIG. 11. A plurality of slots 51 is formed, and these expressed roughly are arranged in two consecutive rows transversely to the conveying direction F. All slots 51 in each case have a longitudinal axis which is aligned at an angle of 45 degrees relative to the conveying device F of the conveying element 2. Thereby, the slots 51 in FIG. 11 are arranged in both rows in a manner such that at least a part of a slot 51 intersects a straight line that runs in the conveying direction F in the region of the two rows of slots 51. In other words, the conveying element 2 in the region of the two rows of the slots 51 is moved in the conveying direction F at least over a part of one of the slots 51. In this manner, it is ensured that the conveying element 2 in the region of the row of slots 51 can be moved in the conveying direction F at least once, past a part of the slot 41, and can be cleaned by way of this.

The invention claimed is:

1. A conveying device, comprising:
   a circulatorily led, extensively extended conveying element that forms a conveying sections with a conveying surface, and a return section,
   a front head-end region, in which the conveying element is deflected from the conveying section in the movement direction of the conveying element into the return section,
   a braking device that is designed for exerting a braking effect upon the driven conveying element, wherein:
   the braking device comprises a braking surface that can have a contact fit with the conveying element and which, by way of sliding friction with the conveying element, at least partly exerts the braking effect upon the driven conveying element,
   the braking device is designed and arranged so as to exert the braking effect upon the conveying element at a location outside the front head-end region as well as upon the conveying element outside the conveying section,
   the braking surface is designed in an essentially bent manner and is wrapped by a part of the conveying element, and
   wherein, in addition to the braking surface, the braking device further comprises a preliminary brake that is arranged upstream of the braking surface in the movement direction of the conveying element, said preliminary brake serving to exert a braking effect upon the conveying element.

2. The conveying device according to claim 1, wherein the conveying device comprises a control device that is designed for controlled moving of the essentially bent braking surface.

3. The conveying device according to claim 1, wherein the bent braking surface is spatially fixed.

4. The conveying device according to claim 1, wherein the bent braking surface has a constantly increasing or a constantly reducing curvature.

5. The conveying device according to claim 1, wherein a wrap angle of the braking surface is at least 90 degrees.

6. The conveying device according to claim 1, wherein the braking surface is arranged in a rear head-end region, in which the conveying element is deflected from the return section into the conveying section.

7. The conveying device according to claim 1, wherein the braking surface is designed as a deflection of the conveying element into the conveying section.

8. The conveying device according to claim 1, wherein the braking device comprises a cleaning opening for cleaning the conveying element, wherein the cleaning opening is formed in a region of the braking device, in which the braking device is arranged directly below the lower side of the conveying element.

9. The conveying device according to claim 1, further comprising a drive device that is designed so as to drive the conveying element by way of a positive fit and/or friction fit, at a location which is arranged downstream of the conveying section as well as upstream of the braking device, in the movement direction of the conveying element.

10. The conveying device according to claim 1, wherein the preliminary brake engages on the conveying element at two regions of the conveying element, wherein said two regions are spaced from one another transversely to the movement direction of the conveying element, and said regions are arranged on two opposite edges of the conveying element.

11. The conveying device according to claim 1, wherein the preliminary brake comprises a preliminary brake body that is designed and arranged so as to exert pressure upon an extensively-surfaced formed side of the conveying element, presses the conveying element against a preliminary brake counter-body and thereby brakes the conveying element by way of sliding friction.

12. The conveying device according to claim 11, wherein the preliminary brake comprises a setting device for changing the pressure that is exerted by the preliminary brake body upon the side of the conveying element, which is formed in an extensively-surfaced manner.

13. The conveying device according to claim 1, wherein the braking device comprises several essentially bent braking surfaces that are arranged one after the other in the movement direction of the conveying element.

14. The conveying device according to claim 13, wherein the braking surfaces, which are successive to one another in the movement direction of the conveying element, are arranged in each case on opposite sides of the conveying element, which are formed in an extensively-surfaced manner.

15. The conveying device according to claim 1, further comprising an extensively-surfaced support of a part of the conveying element in the conveying section in a gravitation direction, wherein the extensively-surfaced support in particular comprises slide rails.

* * * * *